May 15, 1962 O. E. BATORI 3,034,709

COMPUTER

Filed Jan. 19, 1959 5 Sheets-Sheet 1

INVENTOR.
OSCAR E. BATORI
BY
James and Franklin
ATTORNEYS

May 15, 1962 O. E. BATORI 3,034,709

COMPUTER

Filed Jan. 19, 1959 5 Sheets-Sheet 2

INVENTOR.
OSCAR E. BATORI

BY James and Franklin

ATTORNEYS

May 15, 1962 O. E. BATORI 3,034,709

COMPUTER

Filed Jan. 19, 1959 5 Sheets-Sheet 3

INVENTOR.

OSCAR E. BATORI

BY

James and Franklin

ATTORNEYS

May 15, 1962 O. E. BATORI 3,034,709

COMPUTER

Filed Jan. 19, 1959 5 Sheets-Sheet 4

INVENTOR.
OSCAR E. BATORI
BY
James and Franklin
ATTORNEYS

INVENTOR.
OSCAR E. BATORI
BY
James and Franklin
ATTORNEYS

United States Patent Office 3,034,709

Patented May 15, 1962

3,034,709

COMPUTER

Oscar E. Batori, 551 5th Ave., New York, N.Y.

Filed Jan. 19, 1959, Ser. No. 787,768
18 Claims. (Cl. 235—61)

The present invention relates to a mechanical device for facilitating the solution of graphical problems. In the specific form here disclosed it is specially adapted for the solution of the spherical triangle problem in general and the navigational triangle problem in astro-navigation in particular.

Astro navigation is the most reliable, simple and accurate procedure known for fixing one's position on the earth's surface or in the air. Its simple rule is: follow the stars. From the position of the star, geographical position of the observer can be determined. The terrestrial and celestial coordinates are the meridians and parallels of the sphere. These are the same in the equatorial and horizon system as well. The position of the star can be defined either by its coordinates in the equatorial system, namely its angular distance around and above the celestial equator, identical with longitude and latitude, or in the horizon system, around and above the horizon. Tables contain the coordinates of the stars in the equatorial system for any instant; whereas the coordinates of the horizon system are obtained by direct observation.

The procedure of astro navigation implies the conversion of data of one coordinate system into the other. This can be done by mathematical, tabular or graphical methods, or mechanically, as with the present invention.

This invention relates to rotating graticule type computers. Its flexible technique offers new and various methods in solving the problems of astro navigation, eliminating the tedium and limitations of the mathematical and the tabular or graphical methods.

The device of the present invention is specially designed to permit the solution of spherical triangle problems, of which coordinate conversion is but one example, mechanically, without arithmetical or graphical computation and in a simple and expeditious manner. Typical examples of the problems which this computer can solve are: determination of altitude and azimuth of any heavenly body (line of position of the observer); determination of geographical position (latitude and longitude) of any point on the earth's surface by observation of a single heavenly body (lone star problem); determination of line of position using star altitude only without azimuth; determination of geographical position of the observer by one star and Polaris, with star altitude only, without azimuth; and determination of great circle course and distance between two points on the earth's surface, with course and latitude at intermediate points.

The computer of the present invention involves the use of an appropriately designed graticule which, when the device is to be used for celestial navigation or spherical triangle problems, is graduated with a high degree of accuracy in terms of spherical coordinates (latitude and longitude). An optical eye is provided which can be moved over the surface of the graticule so that small selected areas thereof may be enlarged and viewed. The viewing takes place at a fixed viewing station, the optical eye being operatively connected to that viewing station by an optical system which permits movement of the eye over the graticule without any change in the position of the image at the viewing station, as viewed in the eye piece. The graticule is shiftable (for spherical triangle problems it is rotatable) and is provided with a second scale indicating the degree to which it has been shifted (rotated) from a reference position. Means in the form of a second optical system are preferably provided so that the adjusted position of the graticule relative to its reference position can be viewed at the viewing station at the same time as the portion of the graticule opposite the optical eye is there viewed. The viewing station is preferably provided with a reference member, such as crossed hair lines, the position of which is shiftable so that it can be brought into accurate coincidence with a particular point on the graticule surface. It is preferred that the reference member also be rotatable so that the crossed lines may be brought into coincidence or parallelism with the graduation lines on the graticule as they are observed at the viewing station.

The device may use external light, either natural or artificial, or it may be provided with its own source of illumination for the graticule. In the form here specifically disclosed the computer may be used either with external light or with its self-contained illumination source. The use of the self-contained illumination source in the form here disclosed involves reflection from the graticule, thus producing at the viewing station an easy-to-read grid of bright lines on a dark background, this being the preferable method of use of the device. External light, when it is employed, passes through the graticule and will produce a reverse image of dark lines on a light background. As here disclosed each of the optical systems, one for the graticule per se and the other for the graticule-shift-indicating scale, can each be used with external light and are each provided with independent self-contained sources of illumination.

In order to facilitate the accurate location of the optical eye relative to the finely graduated graticule surface a second graticule is employed which is visible from the exterior of the device and which is graduated in a manner comparable to that of the first graticule, although permissibly in a much coarser manner. The self-contained illumination source for the first optical system (for observing the graticule) provides a beam of light a portion of which is reflected from the graticule to the viewing station, as set forth above. Another portion of that light beam passes through the first graticule to the second externally visible graticule, the location of the readily visible light beam on the second graticule indicating in an unmistakable manner the location of the optical eye relative to the first and finely graduated graticule.

The images from the first and second optical systems, indicating respectively the graticule graduations and the degree to which the graticule has been shifted from its reference position, are both formed on the same plane, and preferably at the focal plane of an optical eyepiece at the viewing station, that plane substantially coinciding with the plane of the reference element. Consequently all of the data is readily and simultaneously visible at the viewing station without change in the observer's position, thus providing for speed and convenience of operation and minimizing the possibility of error.

Since the degree to which the graticule must be shifted (rotated) must be accurately controlled a special connecting mechanism is provided between the graticule and a manually actuatable control element on the exterior of the device, that mechanism providing for coarse and fine adjustment of the graticule shift. It is so constructed that when the control element is moved in a direction opposite to that of its previous movement the graticule will first be shifted slowly for fine adjustment and thereafter rapidly for coarse adjustment. Thus, to set the graticule to a shifted position it is first moved rapidly somewhat past the desired position and then the control element is moved in the opposite direction, resulting in fine adjustment of the graticule position.

The computer of the present invention, although specifically designed for use in connection with celestial navigation, is capable of use in the solution of many other types of problems, depending upon the particular graduations which are formed on the graticule. The term "graticule" is, throughout this specification and in the claims, used generically to denote a body upon which an appropriately graduated scale or graphical representation is formed.

The computer of the present invention is comparatively small in size, light in weight, easy to carry and operate, and will keep its accuracy over years of heavy usage and under extremes of climatic conditions.

To the accomplishment of the above, and to such other objects as may hereinafter appear, the present invention relates to the construction of a computer as defined in the appended claims and as described in this specification, taken together with the accompanying drawings, in which:

Figure 12:
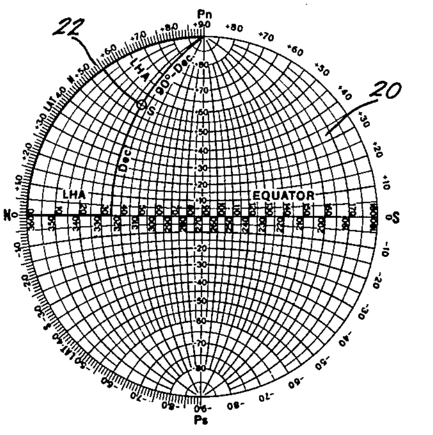
Figure 13:
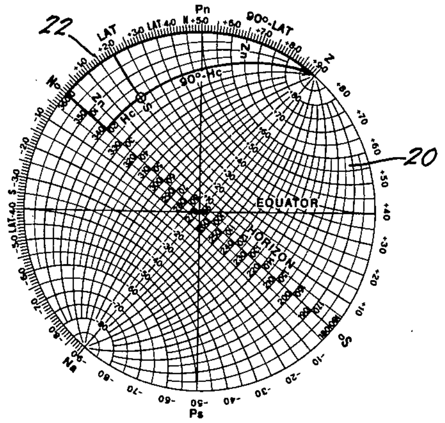
Figure 10:
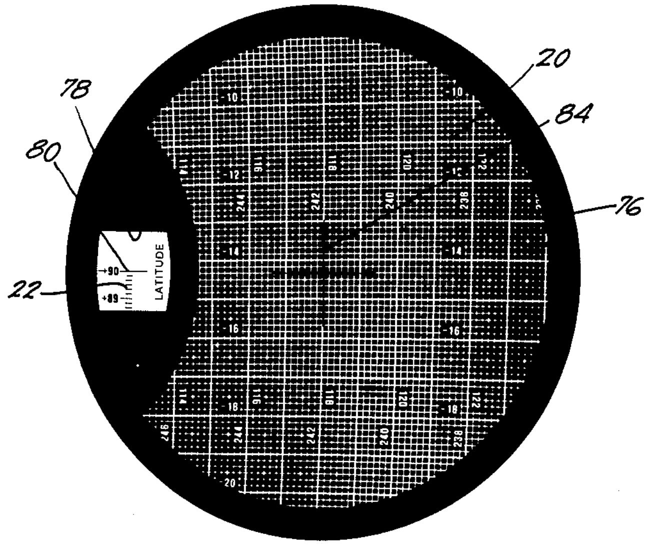
FIG. 10 is a view similar to FIG. 4 illustrating what is seen at the viewing station when light from the self-contained source is reflected from the graticule.
Figure 11:
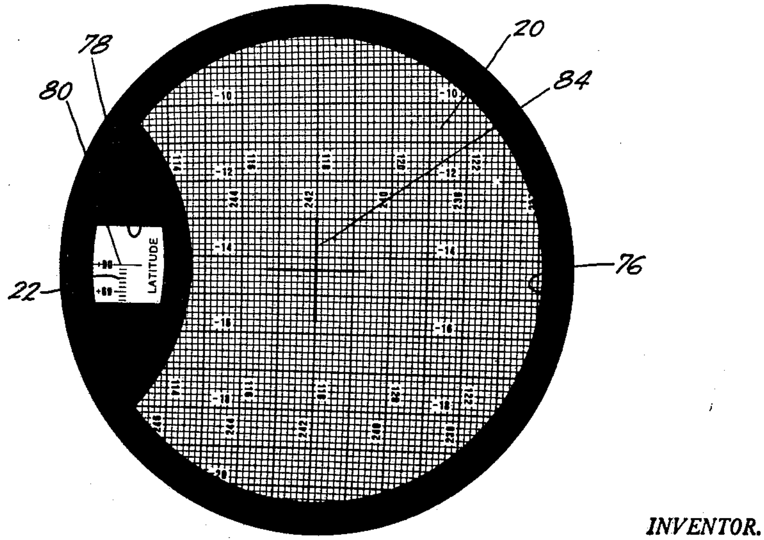

FIG. 11 is a view similar to FIG. 10 but showing what is seen at the viewing station when outside light passes through the graticule; and FIGS. 12 and 13 illustrate the different positions of the graticule in a simple coordinate conversion problem where the declination and the local hour angle of a star S are known (FIG. 12) and one wishes to determine the altitude and azimuth of that star when observed from a particular latitude (FIG. 13).

Figure 2:
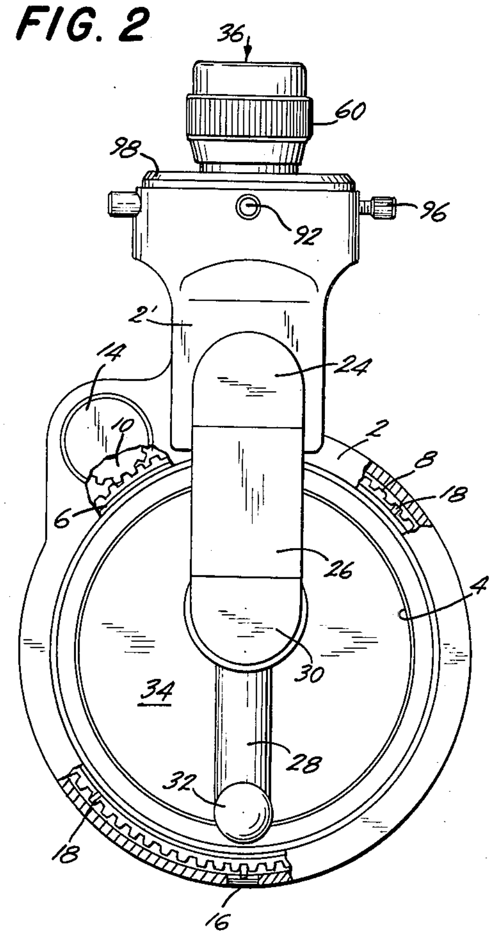
FIG. 2 is a front elevational view thereof with the optical eye in a given position and with certain portions broken away to show the graticule-shifting means.
Figure 3:
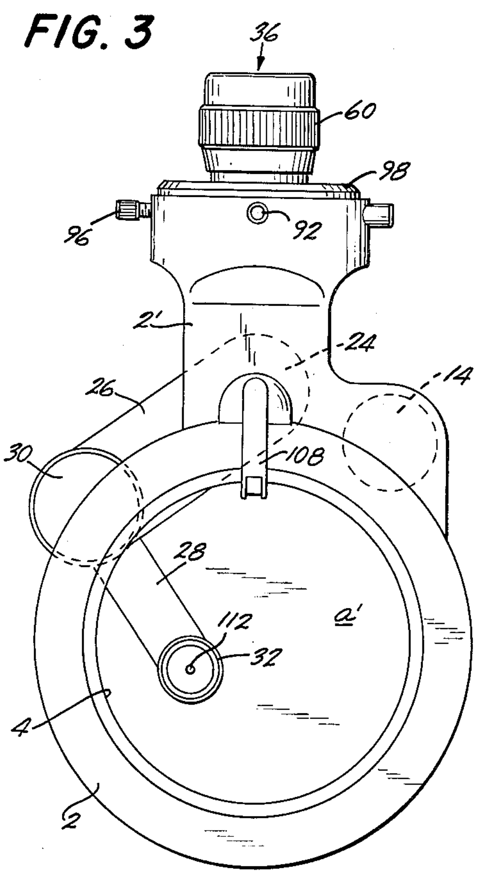
FIG. 3 is a rear elevational view showing the optical eye in a different position.
Figure 4:
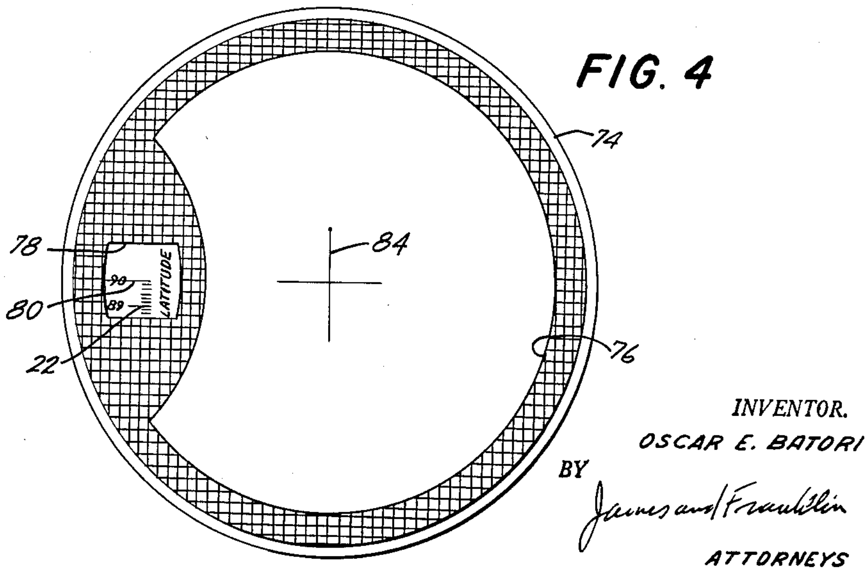
FIG. 4 is a representation of what is seen at the viewing station but without any showing of the viewed area of the graticule.
Figure 5:
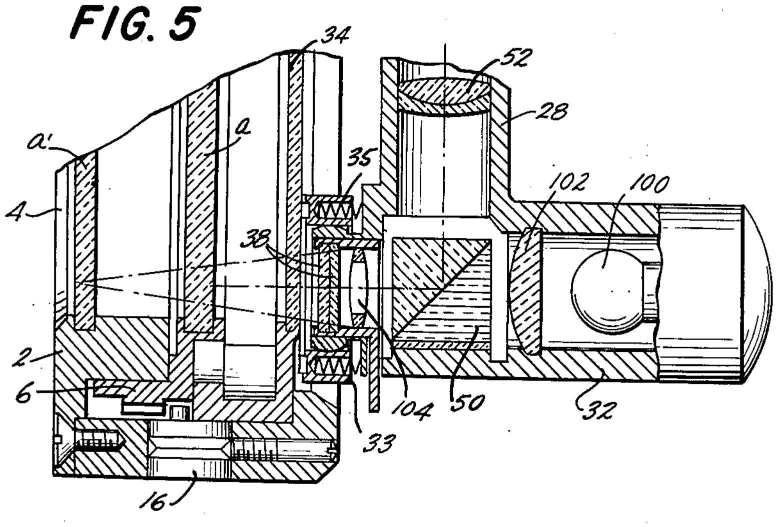
FIG. 5 is a cross sectional view on an enlarged scale of the lower portion of FIG. 1.

The computer comprises a frame generally designated 2 having a lower portion with a central opening 4 in which a coarsely graduated and transparent graticule *a'* formed of glass or plastic is fixedly mounted. A ring 6 is rotatably mounted on the frame 2 behind the coarse graticule *a'*, and it carries the finely graduated graticule *a*, also formed of glass or plastic, in a position immediately behind the coarse graticule *a'*. The ring 6 is provided with peripheral gearing 8 drivingly engaged by gear 10 which is connected to adjusting knob 14 rotatably mounted on the exterior of the casing 2. The connecting mechanism will be described hereinafter. For present purposes it is sufficient to state that rotation of the knob 14 causes rotation of the ring 6, and with it the graticule *a*. A stop 16 is mounted in the wall of the casing 2 and is engageable with protrusions 18 (see FIG. 2) on the ring 6 so as to limit the rotational movement of the ring 6 to 180° degrees.

Figure 1:
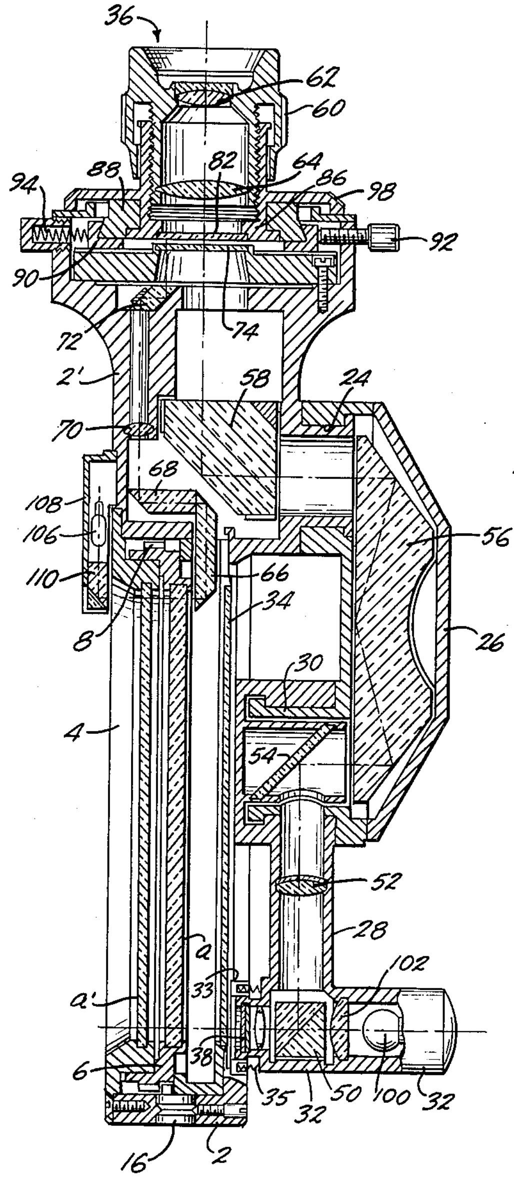
FIG. 1 is a vertical cross sectional view of one embodiment of the present invention.
Figure 8:
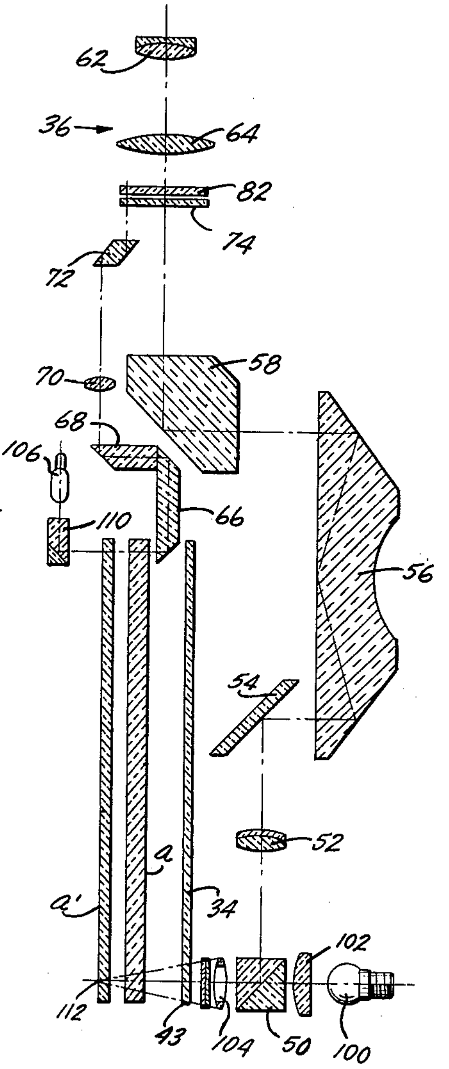
FIG. 8 is a view similar to FIG. 1 but showing only the optical elements.
Figure 9:
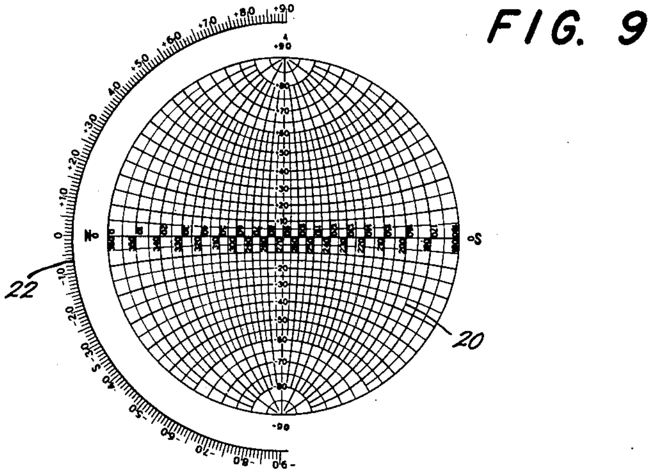
FIG. 9 illustrates the graduations on a graticule used for the solution of celestial navigation problems, but with the finer graduations and indicia eliminated.

The graticule *a* is provided with graduations 20 illustrated as a stereographic projection of the earth's sphere of coordinates of meridians and parallels. All of these graduations are not shown in FIG. 9. Desirably, these coordinates are given at every 10′ intervals, engraved in metal on the glass surface of the graticule *a* by precision photographic and high vacuum techniques. The graduations are such that every square mile on the earth's surface can be accurately located. It is preferred that every second degree meridian and parallel be noted according to its longitude and latitude, thus facilitating the reading of the graticule at the viewing station, where only a small part of the overall graticule surface is visible. Of course, for different problems any other suitable design could be formed on the graticule, such as an orthographic projection or graphs of appropriate mathematical functions. The fine graduations which would actually be present between the lines shown in FIG. 9 are so thin, about 0.004 inch, and so close to one another, spaced by a similar distance, that they can be neither printed manually nor observed by the unassisted eye. Since the graticule graduations 20 as thus described are formed of metal, they will reflect the light which impinges upon it coming from the right hand side as viewed in FIG. 1. The graduations, since they are engraved in metal on glass, provide paths between themselves through which light can pass from the left hand side of the graticule *a* as viewed in FIG. 1.

The graticule *a* is also provided with a semi-circular scale 22 extending around the periphery of the graduations 20 and graduated, for celestial navigation purposes, from plus 90 degrees to minus 90 degrees.

The outer graticule *a'* is light-transmissive and has formed on the surface thereof the coarser graduations of the scale 20 on the graticule *a*.

Pivotally mounted on the central portion of the casing 2, at 24, is a hollow arm 26 to the end of which a second hollow arm 28 is pivotally mounted at 30. An optical eye 32 is carried by the arm 28 at its end, that eye being provided with a shoe 33 resiliently urged by means of springs 35 into engagement with a glass plate 34 fixedly mounted in the frame 2 to the right of the graticule *a*. Because of the articulate nature of the linkage defined by the arms 26 and 28, the eye 32 may be brought over any selected area of the graticule *a*, and it is retained in its adjusted position by reason of the friction between the shoe 33 and the glass plate 34.

A viewing station generally designated 36 is provided at the upper portion 2' of the instrument. A first optical system transfers the view of the selected graticule area which the optical eye 32 "sees" to the viewing station 36. That first optical system comprises a pair of protective transparent plates 38 which may, if desired, have a polarizing effect and be relatively rotatable, thereby to control the intensity of the image at the viewing station 36, followed by prism 50, objective lens 52, mirror 54, prism 56, and prism 58. The elements 38 and 50 are mounted in the optical eye 32, the elements 52 and 54 are mounted in the arm 28, the element 56 is mounted in the arm 26, and the element 58 is mounted on the upper casing portion 2'. This optical system produces an enlarged image of the area of the graticule *a* viewed by the optical eye 32 at the viewing station 36 and preferably in the focal plane of the viewing eye piece 60 which carries lenses 62 and 64. The eye piece 60 may be screwed in and out for focusing purposes.

A second optical system is provided for viewing the graticule scale 22 at the viewing station 36. This system comprises prisms 66 and 68, objective lens 70 and prism 72, all carried in fixed position by the frame 2, the lower tip of the prism 66 extending over that portion of the graticule *a* which carries the scale 22. The image of the scale 22 formed by this second optical system at the viewing station 36 is also preferably in the focal plane of the eye piece 60.

The viewing station 36 also comprises a fixedly mounted glass disk 74 having a template pattern formed thereon so as to produce a large window 76 and small window 78, the former being located so that light from the first optical system passes therethrough, the portion of the graduations 20 of the graticule *a* viewed by the eye 32 being visible therethrough, the latter being located so that light from the second optical system passes therethrough, the particular portion of the graticule scale 22 viewed by the prism 66 being visible therethrough. The window 78 includes a reference line 80. Located closely above the glass plane 74 is a glass disk 82 on which a reference member 84, such as crossed hairlines, is formed, the disk 82 preferably being located in the focal plane of the eye piece 60. The cross lines 84 are designed to register with the window 76. The disk 82 is fixedly mounted in carriage 86 which is in turn rotatably mounted in slide 88, the slide 88 being slidable in a direction perpendicular to the plane of the drawing of FIG. 1 in slide 90, which is in turn slidably mounted on the frame 2' in the plane of the drawing of FIG. 1. Externally accessible adjustment screw 92 acts against spring 94 to locate the slide 90, while externally accessible adjustment screw 96 acts against a comparable spring (not shown) to position the slide 88. Rotation of the carriage 86 is accomplished by means of the manually accessible portion 98. Thus it will be seen that the cross wires 84 may be brought into accurate registration with any particular point on the viewed image of the graticule graduations 20 and that the cross lines 20 may be rotated so as to coincide or be parallel to the particular graticule graduations.

Each of the optical systems can function by using external light. In the case of the first optical system light will pass through the essentially transparent outer graticule *a'* and between the graduation lines 20 on graticule *a*, thus producing at the viewing station 36 a view such as is shown in FIG. 11, in which the lines will appear dark and the background light. For the second optical system the operation with external light is comparable to that of the first optical system.

The optical eye 32 is provided with a self-contained source of artificial illumination in the form of a bulb 100 adapted to be energized in any appropirate manner. The light of this bulb passes through condenser lens 102 and prism 50 and through the open central portion of condenser lens 104 onto the graticule *a*. The metallic graduations 20 will reflect much of this light back into the optical eye 32, and that light will be transmitted to the viewing station, where the graduations 20 will appear as bright lines on a dark background (see FIG. 10). This normally makes for better visibility, permitting more accurate location of the cross wires 84, so use of the artificial light source 100 is generally preferred.

A second artificial light source in the form of the bulb 106 is provided for the second optical source, that bulb being mounted in a housing 108 on the exterior of the casing 2 and the light therefrom being reflected by prism 110 through the outer graticule *a'* to the graduation portion 22 of the graticule *a*, from which the artificial light enters the prism 66. Since in this second optical system the use of artificial light involves transmission through the graticule *a*, rather than reflection as was the case with the first optical system and the self-contained light source 100, the view at the viewing station 36 will be substantially the same as when outside light was employed (compare FIGS. 10 and 11).

The use of the artificial light source 100 serves another purpose. The ring condenser lens 104 projects a light circle 112 onto the graticule *a'*. This circle 112 is concentric with the field of view of the eye 32 and moves with the eye 32 as the latter moves relative to the graticule *a*. Consequently the location of the light circle 112 on the graticule *a'*, readily visible from the exterior of the computer, will indicate the area being "seen" by the eye 32, and therefore will facilitate the positioning of the latter.

Figure 6:
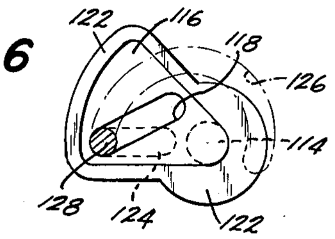
FIG. 6 is a semi-schematic view of the mechanism for providing coarse and fine adjustment of the graticule shift.
Figure 7:
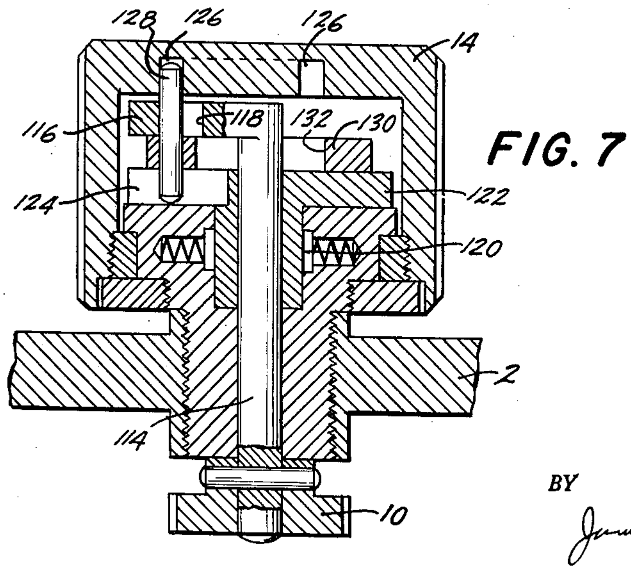
FIG. 7 is a vertical cross sectional view through the graticule-shifting mechanism.

The mechanism for rotatably shifting the graticule *a* is shown in FIGS. 6 and 7. The gear 10 which is directly connected to the graticule ring 6 is mounted on shaft 114 which carries at its upper end sector 116 having angularly oriented slot 118 therein. Surrounding the upper portion of the shaft 114, but frictionally restrained from rotation by means of spring urged shoes 120 bearing thereagainst, is a rotatable member 122 having a substantially radially oriented slot 124 therein adapted to register in part with the slot 118. The undersurface of the control knob 14 is provided with an eccentric groove 126 adapted to partially register with the slots 118 and 124. Pin 128 passes through all three slots and is held by ring 130 interposed between the sector 116 and the rotatable member 122, the ring 130 having a large central opening 132 so that it is capable of lateral movement. With this connection, when the knob 14 is first rotated in a given direction the pin 128 will be moved radially in or out, as the case may be, rotational movement of the pin 128 about the axis of the shaft 114 being at first prevented by the member 122 which is frictionally held against rotation. As the pin 128 moves in or out it will cause some rotation of the sector 116, and hence of the graticule ring 6, but at a slower speed than the knob 14 is rotated, because of the angular orientation of the slot 118 through which the pin 128 passes. When the pin 128 reaches the end of the slot 124 it can then only move in rotation, the element 122 will be rotated, and the gear 10 will be rotated at the same speed as the knob 14. When the direction of rotation of the knob 14 is reversed the same effects will obtain, the gear 10 first being rotated at a relatively slow speed and then at a relatively high speed. The slow speed, of course, is used for fine adjustment of the graticule *a*, whereas high speed is used for coarse adjustment thereof. In use the graticule will first be shifted to a position somewhat beyond its desired position at comparatively high speed, after which the knob 14 will be rotated in the opposite direction in order to provide for fine adjustment of the graticule position.

As may be seen from FIGS. 10 and 11, the first optical system provides for magnification of the restricted area of the graticule graduations 20 viewed by the optical eye 32 so that said graduations, normally so fine and so closely spaced as not to be distinguishable, are clearly seen, together with the numberings relating thereto. Consequently the cross lines 84 may be accurately located to correspond to a particular set of coordinates through manipulation of the adjusting screws 92 and 96. The view in FIGS. 10 and 11 indicates that part of the graticule graduations 20 between meridians 114° and 123° and parallels 9° S and 20° S.

FIGS. 12 and 13 illustrate the use of the device in converting from one set of coordinates to the other. FIG. 12 illustrates the position of a star S in accordance with local hour angle and declination. If, knowing the latitude of the observer, one wishes to determine the altitude and azimuth of that same star, one will, with the graticule *a* at position latitude plus 90, as shown in FIG. 12 (which is generally the initial reference position of the graticule *a*), move the eye 32 so as to view that portion of the graticule graduations 20 corresponding to the known local hour angle (35) and declination (plus 55). Then, with the eye 32 remaining fixed in position, the graticule *a* will be shifted by 90 degrees less the latitude of the observer (90 degrees minus 50 degrees). Since the location of the cross wires 84 and the optical eye 32 have remained fixed relative to the computer casing 2, and the only shift has been in rotation of the graticule graduations 20, the location of the cross wires 84 relative to the graduations 20 will now give the coordinates of the star in terms of azimuth (340°) and altitude (20°).

Another typical way in which the computer may be used as illustrated by the lone star problem, in which geographical position (latitude and longitude) of a point on the earth's surface has to be found by the observation of a single heavenly body. For example, we may know that altitude is 37°06', azimuth is 245°, and declination is plus 70°24'. We are to find local hour angle and latitude. To solve this problem the eye 32 is set by hand approximately to azimuth 245° and altitude 37°06' on the outer graticule *a'*. The cross wires 84 are then set accurately to those azimuth and altitude values as seen in the window 76, the graticule *a* being at its initial reference position as shown in FIG. 12. The graticule *a* is then rotated until the declination value reversed (minus 70°24') appears under the cross wires 84. The corresponding coordinate is read at the cross wire 84 and represents local hour angle (46°47') and the latitude is read in the window 78 at reference line 80 (40°).

Numerous other navigational problems in specific, and spherical triangle problems in general, can be solved by this computer, either by direct reference to the appropriate navigational triangles or by conversion to their corresponding polar triangles. All of the observations are made at a single point and simultaneously. The device is essentially as accurate as the graduations on the graticule *a*, and this accuracy is substantially independent of length of use or external conditions. The graticule graduations 20 and 22 are fully protected, since they are housed within the casing 2 and no moving parts engage them. The device is sturdy and reliable, and its life is relatively unlimited.

While but a single embodiment of the present invention has been here specifically disclosed, it will be apparent that many variations may be made therein, all within the spirit of the invention as defined in the following claims.

I claim:

1. A navigational computer comprising a frame, a viewing station, thereon, a graticule thereon having an operative surface with graduations on said surface defining a projection of meridians and parallels, an optical eye, means mounting said eye on said frame for movement over substantially the entire operative surface of said graticule and relative to said viewing station so as to "see" selected portions thereof, means for mounting said graticule on said frame for adjustable rotatable positioning of said graticule relative to said frame, means for indicating the rotative position of said graticule relative to said frame, and a first optical system operatively connecting said eye to said viewing station, whereby selected portions of said graticule "seen" by said eye can be viewed at said viewing station.

2. The navigational computer of claim 2, in which said means for indicating the rotative position of said graticule relative to said frame comprises a second optical system communicating with said viewing station whereby the rotated position of said graticule is indicated at said viewing station.

3. The computer of claim 2, in which the images produced by said first and second optical systems are simultaneously visible at said viewing station and are in the same focal plane.

4. The computer of claim 1, in which said eye is carried by an articulatable arm mounted on said frame, said first optical system being carried at least in part by said arm.

5. In the computer of claim 1, a second graticule having coarser graduations than said first graticule and visible from the exterior of said computer, and means for indicating thereon the position of said eye relative thereto, thereby to facilitate positioning of said eye relative to said first graticule.

6. The computer of claim 5, said indicating means comprising a light projection system carried by said eye and directing light onto said second graticule at a position corresponding to the position of said eye relative to said first graticule.

7. The computer of claim 1, in which said viewing station comprises a reference member cooperable with the image of said first optical system, said reference member being rotatable and movable in two relatively perpendicular directions laterally with respect to the image of said first optical system.

8. The computer of claim 1, in which said first graticule is both light-transmissive and light-reflective, said graticule being open to external light on the side thereof opposite said eye, whereby external light may pass through said graticule into said first optical system, and a source of artificial illumination carried by said frame on the side of said graticule corresponding to said eye and arranged so that light emanating therefrom is reflected by said graticule into said first optical system.

9. The computer of claim 8, in which said source of artificial illumination is carried by said eye.

10. The computer of claim 8, in which said source of artificial illumination is carried by said eye, a second graticule which is light transmissive on the side of said first graticule opposite said eye, some of the light from said source of artificial illumination illuminating an area of said second graticule corresponding to the area of said first graticule over which said eye is positioned, thereby facilitating location of said eye.

11. In the computer of claim 1, means for rotating said graticule comprising a manually actuatable control element operatively connected to said graticule by mechanism effective to move said graticule comparatively slowly relative to movement of said control element for the first portion of movement of said element in each of its directions of movement, and thereafter effective to move said graticule comparatively rapidly relative to said control element while said element continues to move in a particular direction.

12. In the computer of claim 1, means for rotating said graticule comprising a manually rotatable control element having a slot eccentric to its axis of rotation, a first member frictionally inhibited from rotation and having a slot oriented generally radially relative to the axis of rotation of said control element, and a driven member connected to said graticule and having a slot angularly oriented relative to said slot in said first member, and a pin passing through and slidable along all of said slots.

13. A computer comprising a frame, a graticule thereon, a viewing station thereon, an optical eye mounted on said frame for movement relative to said graticule so as to "see" selected portions thereof, a first optical system operatively connecting said eye to said viewing station, whereby selected portions of said graticule "seen" by said eye can be viewed at said viewing station, a second graticule having coarser graduations than said first graticule and visible from the exterior of said computer, and means for indicating thereon the position of said eye relative thereto, thereby to facilitate positioning of said eye relative to said first graticule.

14. The computer of claim 13, said indicating means comprising a light projection system carried by said eye and directing light onto said second graticule at a position corresponding to the position of said eye relative to said first graticule.

15. A computer comprising a frame, a graticule thereon, a viewing station thereon, an optical eye mounted on said frame for movement relative to said graticule so as to "see" selected portions thereof, a first optical system operatively connecting said eye to said viewing station, whereby selected portions of said graticule "seen" by said eye can be viewed at said viewing station, said viewing station comprising a reference member cooperable with the image of said first optical system, said reference member being rotatable and movable in two relatively perpendicular directions laterally with respect to the image of said first optical system.

16. A computer comprising a frame, a graticule thereon, a viewing station thereon, an optical eye mounted on said frame for movement relative to said graticule so as to "see" selected portions thereof, a first optical system operatively connecting said eye to said viewing station, whereby selected portions of said graticule "seen" by said eye can be viewed at said viewing station, said graticule being both light-transmissive and light-reflective, said graticule being open to external light on the side thereof opposite said eye, whereby external light may pass through said graticule into said first optical system, and a source of artificial illumination carried by said frame on the side of said graticule corresponding to said eye and arranged so that light emanating therefrom is reflected by said graticule into said first optical system.

17. The computer of claim 16, in which said source of artificial illumination is carried by said eye.

18. The computer of claim 16, in which said source of artificial illumination is carried by said eye, a second graticule which is light transmissive on the side of said first graticule opposite said eye, some of the light from said source of artificial illumination illuminating an area of said second graticule corresponding to the area of said first graticule over which said eye is positioned, thereby facilitating location of said eye.

References Cited in the file of this patent

UNITED STATES PATENTS

| | | |
|---|---|---|
| 669,705 | Reeh | Mar. 12, 1901 |
| 1,160,184 | Mackensen | Nov. 16, 1915 |
| 1,203,151 | Sperry | Oct. 31, 1916 |
| 1,721,398 | Jacob | July 16, 1929 |
| 1,864,896 | Egy | June 28, 1932 |
| 1,966,850 | Colt et al. | July 17, 1934 |
| 2,307,951 | Plaut et al. | Jan. 12, 1943 |
| 2,398,544 | Peck | Nov. 20, 1945 |
| 2,747,461 | Boughtan et al. | May 29, 1956 |
| 2,757,567 | Hillman et al. | Aug. 7, 1956 |